Jan. 1, 1935.   C. J. COBERLY   1,985,887
METHOD OF AND APPARATUS FOR REDUCING SKIN FRICTION LOSSES
Filed Aug. 1, 1932   2 Sheets-Sheet 1
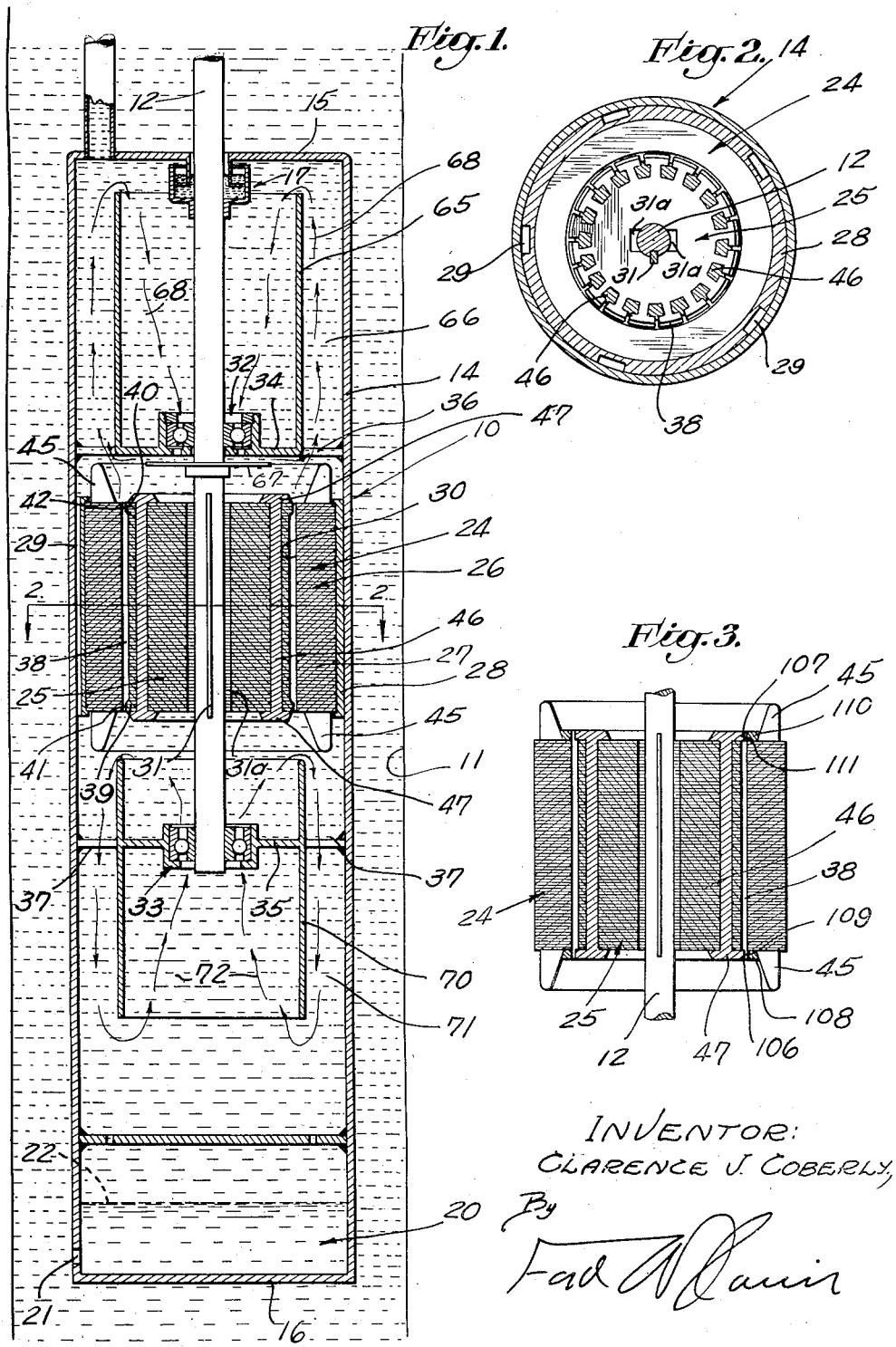

Jan. 1, 1935. C. J. COBERLY 1,985,887
METHOD OF AND APPARATUS FOR REDUCING SKIN FRICTION LOSSES
Filed Aug. 1, 1932   2 Sheets-Sheet 2
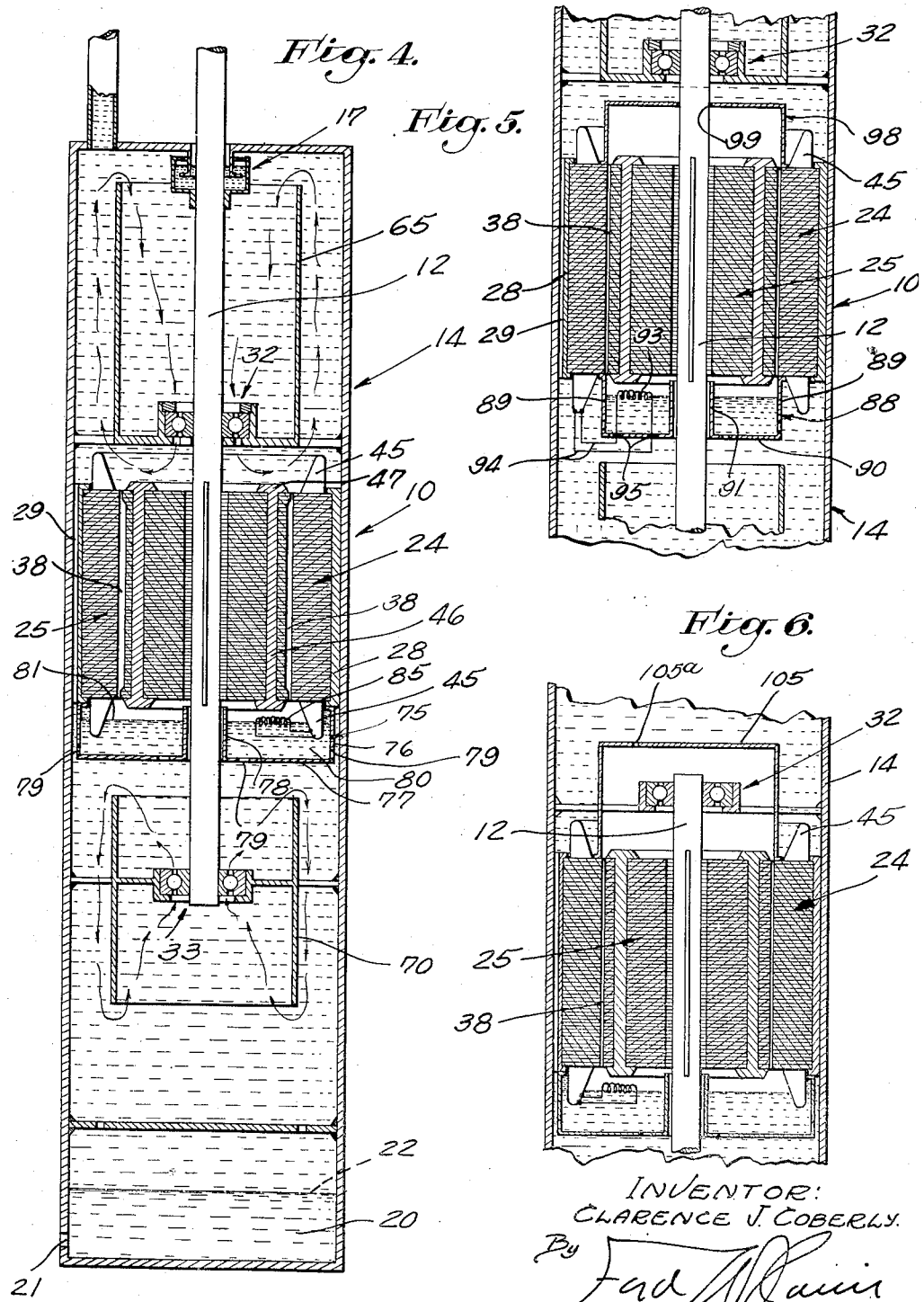
INVENTOR:
CLARENCE J. COBERLY.
By
ATTORNEY.

Patented Jan. 1, 1935

1,985,887

UNITED STATES PATENT OFFICE 1,985,887

METHOD OF AND APPARATUS FOR REDUCING SKIN FRICTION LOSSES

Clarence J. Coberly, Los Angeles, Calif., assignor to Submersible Motor Pump Co., Ltd., Huntington Park, Calif., a corporation of California Application August 1, 1932, Serial No. 627,180

30 Claims. (Cl. 172—36)

My invention relates to a novel system of decreasing skin friction losses in a gap formed between two relatively moving bodies, which gap would otherwise be filled with a liquid. One of the most important applications of the invention is in connection with dynamo-electric machinery, and especially in combination with a submersible motor which may be lowered into a well to a position below the water level therein. It is in this capacity that the invention will be particularly described, though it will be clear that its utility is not limited thereto.

It has often been found desirable to submerge a dynamo-electric machine, such as an electric motor, in a body of a liquid dielectric medium. Not only does the liquid dielectric assist in insulating the windings, but in addition it has a very desirable cooling action on these windings and on the rotating parts.

In other instances still further factors make it desirable to fill the dynamo-electric machine with a liquid dielectric. Thus, in designing a submersible electric motor it has been found desirable to not only fill the space around the motor with a liquid dielectric, but to transfer pressure between this dielectric and the liquid in which the motor is submerged. In such instances the dielectric acts both as an insulating and cooling means and as a lubricating means for the bearings.

It has been found, however, that in the larger installations the liquid which fills the gap between the rotor and the stator exerts a very material frictional drag on the rotor. This skin friction loss is ordinarily small in the smaller sized installations, but becomes a very material factor on larger installations. This is especially so in a submersible motor in view of the limited space considerations which require a relatively long rotor and stator so that the gap therebetween is relatively extended. So also, the skin friction losses are greatly increased when the motor speed is increased. This loss increases approximately as the third power of the angular velocity.

Attempts have been made to correct this difficulty by utilizing a dielectric oil having a low viscosity, but the use of such a dielectric minimizes the loss only so long as the critical velocity is not exceeded. Above the critical velocity the viscosity of the oil appears to have little effect on the loss. Other attempts have been made to increase the size of the gap between the rotor and the stator to decrease this skin friction loss, but this not only reduces the critical velocity, but upsets the magnetic characteristics of the motor to such an extent that it impairs the efficiency thereof.

It is an object of the present invention to provide a method and apparatus for reducing skin friction losses in a gap between two relatively moving bodies.

A further object of the invention is to substantially fill such a gap with a foam, the skin friction exerted by such a foam being extremely small as compared with the skin friction losses which would be present if the gap were to be filled with a dielectric liquid.

These and other objects I accomplish by utilizing a dielectric liquid of such character that it gives off a vapor or a gas when subjected to a temperature corresponding to the temperature normally existing in the gap, and it is an important object of the invention to utilize such a dielectric liquid. When the invention is used in conjunction with a dynamo-electric machine, the windings of the rotor and stator may furnish a convenient source of heat, though auxiliary heating means may be used.

It is possible to release the gas or vapor in the gap itself, or at a position spaced from the gap but in communication therewith. Either system falls within the scope and objects of the present invention.

It is a further object of the invention to set up a thermal cycle, one step of which includes the production of a vaporous material, any excess of this vaporous material being subsequently recondensed, this vaporous material being maintained in the gap.

Further objects of the invention lie in the novel throttle structure for the gap, and in certain other details of construction permitting the gap to be substantially filled with either foam or a vaporous material.

Still further objects and advantages of the invention will be made evident hereinafter.

As mentioned above, the vapor, gas, or foam may be formed either in the gap or at a position outside thereof but communicating therewith, and may be effected by the heat developed in the machine itself or by the application of heat from an external source.

In some instances it is entirely possible to utilize as a dielectric liquid one of the lower boiling-point hydrocarbons which has a sufficient dielectric strength and which will vaporize when subjected to the temperatures in the gap, the vapor substantially filling the gap. Such a dielectric may be a gasoline suitably refined to give it the necessary dielectric strength. If desired the lubricating qualities of such a low boiling-point hydrocarbon may be increased by adding small amounts of oil.

In the preferred form of the invention I prefer to utilize a conventional transformer oil or other carrier liquid of high dielectric strength in which has been dissolved a quantity of an auxiliary substance, such as a more volatile hydrocarbon, to form the dielectric liquid. This auxiliary substance may be either a liquid or a gas. If it is a liquid, it will be dissolved in the oil or other carrier liquid in the sense that any two liquids will go into a chemical solution. If it is a gas, this gas will go into solution in the carrier liquid and will, under the conditions of temperature and pressure existing exterior of the gap, form a dielectric liquid from which the gas will be liberated when subjected to temperatures and pressures such as exist in the gap.

As practical illustrations of such a dielectric liquid the oil or other carrier liquid can be mixed with one or more auxiliary substances such as ethane, propane, butane, pentane, hexane, ethylene, propylene, butylene, amylene, or with certain of the gasolines and other low boiling-point hydrocarbons such as commercial petroleum ether. It should be understood that this list of substances is not exhaustive. An almost unlimited number of various substances of this character can be especially made up to meet any particular situation.

Considering the case in which the carrier liquid is a dielectric oil and the auxiliary substance is a volatile liquid such as petroleum ether, the essential requirements will be met if the solution will vaporize at pressures and temperatures such as exist in the gap, and if this vapor will subsequently condense at the temperatures existing exterior of the gap so that the condensate is again dissolved in the oil.

In the event that the carrier liquid is a dielectric oil and the auxiliary substance is a gas, it is sufficient for the purpose of the present invention to so formulate the solution that at the temperatures and pressures existing exterior of the gap the gas will be dissolved in the oil, and at the temperatures and pressures existing in the gap at least a portion of the gas will be liberated therefrom to substantially fill the gap. The gas which flows from the gap thus re-unites with the oil when reaching the cooler zone exterior of the gap so as to be re-dissolved in the oil.

For the purpose of clearness, I will hereinafter term the mixture of carrier liquid and auxiliary substance as a "dielectric liquid" regardless of whether this auxiliary substance is a liquid or a gas, this term "dielectric liquid" also including any material of such character as to expel a vapor or a gas when subjected to the temperatures in the gap. So also, the term "vaporous material" will be used to designate the material liberated from the solution near or in the gap, whether this liberated material is a gas or a vapor. So also, I will use the term "re-unite" to include the condensing and re-dissolving of a vapor or the re-dissolving of a gas into the dielectric liquid.

It should not be inferred that the conditions present in a given installation will permit of the use of but a single type of dielectric liquid. Various dielectric liquids can be developed to meet any set of operating conditions, and these dielectric liquids may vary both as to the kind and amount of auxiliary substance utilized. Considering, for instance, the case in which the dielectric liquid is composed of a dielectric oil and a volatile liquid dissolved therein, it will be clear that in order for a vapor to be given off in the gap, the vapor pressure of the dielectric liquid at the temperature in the gap must be somewhat greater than the pressure existing in the gap. It will, however, be clear to those skilled in the art that the vapor pressure of such a dielectric liquid depends not only upon the vapor pressure of the volatile liquid, but on the relative amounts of the volatile liquid and the oil. Thus, a dielectric liquid containing 10% of one volatile liquid may vaporize at the same temperature and pressure conditions as a dielectric liquid containing 20% of a different volatile liquid. A proper solution for a given set of conditions can be ascertained either empirically or by the use of well-known chemical and physical laws. Usually commercial factors are controlling in deciding which dielectric liquid is the more practical. Other factors such as comparative dielectric strengths of the dielectric liquids, the relative immiscibilities of the volatile liquid with water, etc., must also be taken into consideration in certain instances.

As a practical illustration of one embodiment of the invention, but without limiting myself thereto, I will describe in detail the invention as applied to a submersible electric motor. Such a submersible motor is disclosed in the drawings, in which—

Fig. 1 is a sectional view of one embodiment of the invention in conjunction with one type of submersible motor.

Fig. 2 is a sectional view taken on the line 2—2 of Fig. 1.

Fig. 3 is a fragmentary view illustrating an alternative form of gap construction.

Figs. 4, 5, and 6 illustrate still other forms of the invention.

Referring particularly to Fig. 1, I have illustrated a submersible motor 10 supported in a well 11 by means not shown and providing a rotatable member in the form of a shaft 12 extending upward therefrom to drive any suitable device such as a pump. The submersible motor 10 is lowered into the well liquid so as to be surrounded thereby.

The form of submersible motor shown in Fig. 1 includes a shell 14 closed at its upper and lower ends by heads 15 and 16. The shaft 12 extends through the upper head 15 and is sealed with respect thereto by a suitable sealing means 17 illustrated as being in the form of a mercury or other fluid-packed seal. The particular seal utilized is not a part of the present invention; any type of seal which effectively prevents admixture between the liquids inside and outside of the shell 14 may be used.

The liquid inside the shell is the dielectric liquid hereinbefore mentioned and completely fills the upper end of this shell. In the form of submersible motor shown in Fig. 1 the lower end of the shell 14 forms a storage means which may be in the form of a balance chamber 20 which is in open communication with the well liquid through a port 21. This permits the lower end of the balance chamber to be filled with a body of well liquid, while the remainder of the shell is filled with the dielectric liquid, these liquids thus being in pressure-equalizing contact at a surface in the balance chamber indicated by the numeral 22. My invention is not, however, limited to a pressure-equalized system nor to a system in which the well liquid has access to one portion of the interior of the shell 14. It has been found, however, that a pressure-equalized system has many advantages inasmuch as it automatically compensates for a change in volume due to the liberation of the vaporous material. This system also compensates for any change in volume of the dielectric liquid itself due to heat developed in the motor. In either event the chamber 20 acts as a storage chamber receiving the dielectric liquid displaced from the vicinity of the motor.

Positioned in the shell 14 so as to be surrounded by the dielectric liquid is an electric motor 24 including a rotor 25 and a stator 26. The stator may conveniently be of the "can" type, in which event the stator laminations will form a magnetic body 27 retained in a sheath 28. This sheath fits in the shell 14 and preferably provides one or more passages 29 in the periphery thereof and communicating between opposite ends of the stator.

The stator 26 provides an opening 30 in which the rotor 25 is positioned, this rotor being suitably secured to the shaft 12 as by a a key 31. Openings 31a may be formed through the rotor if desired, these openings allowing a transfer of dielectric liquid from one end of the rotor to the other. The shaft 12 is suitably journalled in bearings 32 and 33 mounted respectively in intermediate heads 34 and 35 which are in turn supported on arms 36 and 37 extending inward from the shell 14.

The outer diameter of the rotor is smaller than the inner diameter of the opening 30 of the stator so as to provide a gap 38 therebetween which communicates at opposite ends with the dielectric liquid. The rotor and stator may be of conventional construction, in which event the gap 38 will be of substantially uniform width throughout its length. It is usually preferable, however, to provide a restricted passage communicating with one or both ends of the gap 38 so as to throttle the material moving into or from the gap. This may be accomplished in a number of ways. In the form of the invention shown in Fig. 1, I have disclosed enlargements or beads 39 and 40 formed on the rotor and extending partially across the gap 38 to define intake and discharge passages 41 and 42, the former communicating between the lower end of the gap 38 and the space below the motor, and the latter communicating between the upper end of the gap 38 and the space above the motor. In the form shown in Fig. 1, the end laminations of the rotor are punched slightly larger than the intermediate laminations thereby giving this desired effect. It should be understood, however, that such enlargements or beads can be formed either on the rotor or on the stator, or on both.

The shape of the gap 38 in Fig. 1 is greatly distorted for illustrative purposes. In actual practice the distance across the intermediate portion of the gap 38 will be determined by the electrical characteristics of the motor and will usually be in the neighborhood of from .02 to .05 inches, though this distance will vary with the desired electrical performance. The distance across the intake and discharge passages 41 and 42 will be several thousandths of an inch less and may, for instance, range from .005 to .015 inches varying with the viscosity of the dielectric, the speed of rotation of the shaft, the type of auxiliary substance in solution with the carrier liquid, the volume of the gap 38, etc. The distance across these intake and discharge passages 41 and 42 is not however, extremely critical and the best proportions can be readily obtained by empirical methods. In some instances it is desirable to make the discharge passage 42 narrower than the intake passage 41.

It is necessary to provide a heating means at or near the gap 38, and when the invention is utilized in conjunction with a dynamo-electric machine the windings on the rotor and stator may constitute such a heating means. The stator winding is indicated in Fig. 1 by the numeral 45 and extends from opposite ends of the stator to a position beyond the rotor, in the usual manner. The rotor winding is illustrated as being of the conventional squirrel-cage type, including bars 46 cast integrally with end rings 47 in the usual manner.

The invention also utilizes a cooling means to complete the thermal cycle by cooling the vaporous material so that it will re-unite with the dielectric liquid. When the invention is used in conjunction with the submersible motor the well liquid itself forms an excellent means for conducting heat from the interior of the motor shell. This heat is transferred from the dielectric liquid inside the shell and through the walls of this shell to the well liquid. To obtain a maximum cooling effect it is usually desirable to utilize some form of baffle means at opposite ends of the motor so that the dielectric liquid is conducted along and in contact with the inner wall of the shell 14, thereby effecting a maximum heat transfer. In the form shown in Fig. 1 an upper cylindrical baffle 65 extends upward from the intermediate head and cooperates with the shell 14 in providing an annular cooling space 66. The rotation of the rotor 25 naturally acts as a pumping means tending to move the solution outward and upward through the cooling space 66. If desired, this action may be increased by utilizing an auxiliary pumping means such as a disc 67 secured to the shaft 12 and spaced a slight distance from the intermediate head 34. Rotation of this disc will move the dielectric liquid outward between the head 34 and the rotating disc. It will thus be clear that a circulation path is set up in the upper end of the shell which is upward in the cooling space 66 and downward through the central portion of the baffle 65 and through the bearing 32. This circulation path is indicated by the arrows 68 of Fig. 1. Any vaporous material moving from the upper end of the gap 38 enters this circulation path and is drawn upward into the cooling space 66 whereby this vaporous material is re-united with the dielectric liquid.

Similarly, a lower cylindrical baffle 70 may be secured to the intermediate head 35 to define an annular cooling space 71 immediately inside the shell 14. Auxiliary pumping means may be utilized if desired, though usually the rotation of the shaft and rotor, as well as thermal effects, acts to circulate the dielectric liquid in a closed path around the baffle 70 as indicated by arrows 72.

Several modes of operation are possible, depending upon the particular dielectric liquid utilized and on the thermal conditions in or adjacent the motor. Considering first the action which takes place when the dielectric liquid is formed of a hydrocarbon of low boiling-point, it will be clear that any of this volatile hydrocarbon which enters the gap 38 will be vaporized therein, the vapor substantially filling the gap 38. This vapor will, of course, tend to rise in the gap, but this upward flow will be throttled by the discharge passage 42. Any vapor escaping through this passage enters the cooling means and is condensed as previously set forth. The presence of the vapor in the gap 38 will prevent this gap from filling with the dielectric liquid. In fact, under usual operating conditions the vaporization takes place in the extreme lower end of the gap so that substantially the whole gap is filled with the vapor. Equilibrium is automatically maintained, only so much dielectric liquid being permitted to enter the lower end of the gap 38 as will compensate for the vapor escaping from the upper end thereof. The intake passage 41 also acts as a throttle means for retarding entrance of additional dielectric liquid into the lower end of the gap.

In other instances it is possible to vaporize the volatile hydrocarbon forming the dielectric liquid at a position immediately outside the gap 38. In some instances it is possible to develop sufficient heat in the lower portion of the winding 45 of the stator to accomplish this result, in which event vaporization will take place below the gap 38 and in the space bounded by that portion of the stator winding 45 which extends downward from the stator 26, this portion of the stator winding acting as a bell to guide the vapors upward into the gap. Usually, however, it is preferable to allow vaporization to take place in the gap itself when utilizing such a volatile hydrocarbon as a dielectric liquid.

Coming next to the case in which the dielectric liquid is formed of a carrier liquid in which is dissolved either an auxiliary liquid of low boiling-point or a gas, it will be clear that if the liquid dielectric is moved into the lower end of the gap 38 before the vaporous material is driven therefrom, this vaporous material will move upward in the gap 38 as previously described. It will be understood, however, that only the gas or the auxiliary liquid of low boling-point will be liberated. The balance of the dielectric liquid (comprising the carrier liquid and any of the auxiliary liquid which has not yet been vaporized) will still be present in the gap 38. The clearances in this gas are relatively small and the balance of this dielectric liquid is thus violently agitated with the vaporous material which is being driven therefrom thus resulting in the formation of a foam which substantially fills the gap 38. This foam, being of lower density than the dielectric liquid, tends to rise in the gap 38 somewhat analogous to the action of a gas-lift pumping system utilized in pumping wells. Any of the foam which escapes through the discharge passage 42 will be cooled, as previously set forth. In the event that an auxiliary liquid of low boiling-point is utilized, the foam will comprise a mixture of the vapor and the carrier liquid, and the vapor will be condensed in the cooling means so as to go back into solution. In the event that a gas is dissolved in the carrier liquid, the foam will comprise a mixture of this gas and the carrier liquid, and when the foam is subjected to the cooling action on the upper end of the shell 14 this gas will re-dissolve with the carrier fluid. In either event the vaporous material present in the foam will be re-united with the carrier liquid due to the cooling action.

It is also possible to drive off the vaporous material at a section exterior of the gap 38. If this is done, it will be clear that only the vaporous material rises into and through the gap 38 so that no foam is produced. Such liberation of the vaporous material can, in some instances, be effected by the heat present in that portion of the stator winding 45 which extends downward from the stator 26, in a manner previously described. If such a system is to be utilized, it is usually preferable to design the motor in a manner shown in Figs. 4, 5, or 6.

Referring particularly to Fig. 4, I have illustrated a baffle structure 75 secured to the lower end of the sheath 28 of the stator. This baffle structure provides a downward extending portion 76, an inward extending portion 77, and an upward extending portion 78, the latter portion extending upward immediately around the shaft 12. One or more openings 79 are formed through the baffle structure 75 so that the dielectric liquid has free access to a chamber 80 defined thereby. The lower portion of the stator winding 45 extends downward in the chamber 80 formed by the baffle structure 75, and this portion of the stator winding may be utilized as a heating means for releasing the vaporous material from the dielectric liquid in the chamber 80. The chamber 80 may thus contain a body of vaporous material and a body of the dielectric liquid, the surface of the latter being indicated by the numeral 81. This vaporous material is in open communication with the lower end of the gap 38 so that the gap is filled therewith as previously set forth. As the vaporous material moves upward through the gap 38 a new supply of dielectric liquid enters through the openings 79. Sufficient circulation on the dielectric liquid will take place into and from the chamber 80 to insure that this dielectric liquid will always contain a sufficient amount of the auxiliary liquid of low boiling-point or of the dissolved gas.

In some instances the heat developed in the lower portion of the stator winding 45 is not sufficient to effect a liberation of the necessary amount of vaporous material. In this event it is desirable to utilize an auxiliary heating means 85 diagrammatically indicated in Fig. 4 as comprising a coil of resistance wire electrically connected between two phases of the stator winding 45.

In Fig. 5 I have illustrated an alternative form of baffle structure indicated by the numeral 88 and comprising a downward extending portion 89 depending from the stator 26 at a position immediately inside the winding 45. An inwardly extending portion 90 and an upwardly extending portion 91 of the baffle structure are formed as previously described. This structure permits the lower portion of the stator winding 45 to be surrounded by the dielectric liquid, thus increasing the cooling action. An auxiliary heating means 93 is mounted inside the baffle structure 88 and is connected to the stator winding 45 by conductors 94 extending through insulators 95 retained in the baffle structure 88.

So also in Fig. 5 I have illustrated a dome 98 extending upward and inward with respect to the upper end of the stator 26 and defining a closure means. This dome cooperates with the shaft 12 or other rotatable member in defining an annular space. The dome 98 also provides an opening 99 through which the shaft 12 extends, the opening 99 being only slightly larger in diameter than the shaft so as to provide a throttle space which acts to throttle the upward flow of the vaporous material from the annular space. In this form of the invention the throttle means is spaced from the upper end of the gap 38 and this construction makes it possible to utilize a throttle space which is smaller in cross-sectional area than one which could be economically formed by the walls of the gap itself. If desired the junction of the shaft 12 and the dome 98 may be sealed either partially or entirely by the use of a suitable sealing device.

In Fig. 6, I have shown a slightly different construction which is especially useful in those installations wherein the shaft extends downward from the shell 14. In such an instance it is possible to extend the dome completely across the upper end of the shaft. Such a dome is indicated by the numeral 105 of Fig. 6 and may be imperforate so as to entrap the vaporous material therein.

In some instances the cooling action of the dielectric liquid flowing along the exterior of the dome 105 will cool the vaporous material beneath this dome sufficiently to effect a minute amount of condensation. This will not be detrimental, for the condensate will drop downward through the gap and into the dielectric liquid therebelow. In some instances it is, however, desirable to form a small opening 105a through the dome 105 so that a small amount of the vaporous material can escape therethrough and into the upper end of the shell 14. The opening 105a thus acts as a throttle means for this vaporous material.

In the forms of the invention shown in Figs. 5 and 6 I have illustrated conventional rotor and stator constructions so that the gap 38 is not provided with the throttle means at the opposite ends thereof. It should be understood that rotors of the type shown in Fig. 1 may be utilized in conjunction with these forms of the invention, though this is not essential.

So also, it is possible to utilize a gap construction such as shown in Fig. 3, this construction having the advantage that it does not change the magnetic characteristics of the motor. Referring particularly to Fig. 3, the end rings 47 of the rotor winding 46 extend to the periphery of the rotor and slightly therebeyond to form projections 106 and 107. A ring of insulating material 108 is positioned adjacent the lower end of the stator and immediately inside the winding 45, this ring being only slightly larger in diameter than the projection 106 so as to cooperate therewith in defining an intake passage 109 communicating with the lower end of the gap 38. A small ring of insulating material 110 is positioned at the upper end of the stator and cooperates with the projection 107 in defining a discharge passage 111 communicating with the upper end of the gap 38. With such a construction the distance between the magnetic portions of the rotor and stator is constant throughout the length of the gap, and this construction is often preferable to the construction shown in Fig 1, for instance.

In some instances it is desirable to throttle only one end of the gap 38. This is automatically accomplished in the forms of the invention shown in Figs. 5 and 6. When the throttling is effected immediately adjacent the ends of the gap 38 it is often possible to dispense with one or the other of the throttling means. Usually it is preferable to retain the throttling means formed by the discharge passage and eliminate the throttling means defined by the intake passage, though in the preferred embodiment of the invention both throttling means are used to advantage.

It will thus be apparent that the invention includes the utilization of a complete thermal cycle including the liberation of a vaporous material and the subsequent re-uniting of the vaporous material with the dielectric liquid, this vaporous material in the meantime substantially filling the gap between the rotor and the stator of a dynamo-electric machine. Due to the nature of this vaporous material, it is at once apparent that the skin friction losses will be much lower than if the gap were filled with a liquid such as the conventional transformer oil at present utilized. Another important feature of the invention is to utilize a dielectric material which is wholly or partially volatile or which liberates a dissolved material at temperatures existing in the gap of a dynamo-electric machine.

It should be understood that the showings herein are only diagrammatic and that various modifications can be made without departing from the spirit of the invention.

I claim as my invention:

1. A method of decreasing the skin friction losses in a gap between a rotor and a stator of a dynamo-electric machine, which method includes the steps of: bringing into communication with said gap a liquid dielectric capable when heated of liberating a vaporous material; heating said liquid material to liberate said vaporous material; and maintaining said vaporous material in said gap.

2. A method of decreasing the skin friction losses in a gap between a rotor and a stator of a dynamo-electric machine, which method includes the steps of: heating a liquid material until a vaporous material is driven therefrom; subsequently cooling said vaporous material to return said vaporous material to said liquid material to complete a thermal cycle; and maintaining said vaporous material thus formed in said gap.

3. A method as defined in claim 1 in which said liquid dielectric comprises a volatile hydrocarbon.

4. A method as defined in claim 1 in which said liquid dielectric comprises a solution of a carrier liquid and a volatile hydrocarbon, and in which said liquid material is heated only sufficiently to vaporize said volatile hydrocarbon to form said vaporous material and not heated sufficiently to vaporize said carrier liquid.

5. A method as defined in claim 1 in which said liquid material comprises a solution of a carrier liquid and a gas, and in which said liquid material is heated only sufficiently to drive off said gas to form said vaporous material.

6. A method of decreasing the skin friction losses in a gap between a rotor and a stator of a dynamo-electric machine, said gap normally communicating with a liquid, which method includes the steps of: substantially filling said gap with a dielectric foam; and maintaining said foam in contact with said liquid to prevent said liquid from filling said gap.

7. A method of decreasing the skin friction losses in a gap between a rotor and a stator of a dynamo-electric machine, which method includes the steps of: bringing into communication with said gap a dielectric liquid composed of a carrier liquid and a dissolved substance; heating said dielectric liquid until at least a portion of said dissolved substance is driven off in the form of a vaporous material; mixing said vaporous material with the balance of said dielectric liquid including said carrier liquid to form a foam; and maintaining said gap substantially filled with said foam.

8. A method of decreasing the skin friction losses in a gap between a rotor and a stator of a dynamo-electric machine, which method includes the steps of: heating a dielectric liquid composed of a carrier liquid and a dissolved substance until at least a portion of said dissolved substance is driven off in the form of a vaporous material; then mixing said vaporous material with the balance of said dielectric liquid including said carrier liquid to form a foam; subsequently cooling said foam to return said vaporous material to said dielectric liquid to complete a thermal cycle including the heating and cooling steps; and maintaining said gap substantially filled with said foam.

9. A method of decreasing the skin friction losses in a gap between a rotor and a stator of a dynamo-electric machine, which method includes the steps of: slowly introducing into said gap a dielectric liquid composed of a carrier liquid and a dissolved substance which will be liberated from said dielectric liquid in the form of a vaporous material upon the application of heat; heating said dielectric liquid in said gap to liberate said vaporous material; and slowly removing said vaporous material from said gap whereby a new supply of said dielectric liquid enters said gap.

10. A method of decreasing the skin friction losses in a gap between a rotor and a stator of a dynamo-electric machine, which method includes the steps of: heating a dielectric liquid at a position exterior of said gap and to such an extent that a vaporous material is driven therefrom; and conducting said vaporous material into said gap in such quantity that said vaporous material substantially fills said gap.

11. A method of decreasing the skin friction losses in a gap between a rotor and a stator of a dynamo-electric machine, which method includes the steps of: bringing a dielectric liquid into communication with opposite ends of said gap; heating a portion of said dielectric liquid in a position exterior of said gap until a vaporous material is driven therefrom; substantially filling said gap with said vaporous material whereby said vaporous material contacts said dielectric liquid to prevent entrance of dielectric liquid into said gap; moving a stream of said vaporous material through said gap and thence into said dielectric liquid; and cooling said vaporous material exterior of said gap until it re-unites with said dielectric liquid.

12. In combination in a dynamo-electric machine: a rotor comprising one element; a stator comprising another element and cooperating with said rotor in defining a gap therebetween; windings on one of said elements and heating said gap when said dynamo-electric machine is operating; a shell around said rotor and said stator; and a dielectric liquid capable of expelling a vaporous material when subjected to the temperature existing in said gap, said dielectric liquid being retained in said shell in communication with said gap.

13. In combination in a dynamo-electric machine: a shell; a rotor and a stator in said shell and defining a gap therebetween; a body of dielectric liquid in said shell and capable when heated of liberating a vaporous material; heating means in said shell for locally heating said dielectric liquid to liberate said vaporous material, said vaporous material substantially filling said gap during the operation of said dynamo-electric machine and thus preventing the filling of said gap by said dielectric liquid; and cooling means communicating with said dielectric liquid and spaced from said heating means for cooling any excess of said vaporous material sufficiently to re-unite it with said body of dielectric liquid.

14. In combination in a dynamo-electric machine: a rotor and a stator defining a gap therebetween; a body of dielectric liquid communicating with the lower portion of said gap; heating means for heating said dielectric liquid until a vaporous material rises therefrom and substantially fills said gap; and closure means extending above said rotor and retaining at least a part of said vaporous material therebelow and around said rotor whereby said gap is substantially filled with said vaporous material.

15. In combination in a dynamo-electric machine: a rotor and a stator defining a vertically extending gap therebetween; a body of dielectric liquid communicating with the lower end of said gap; heating means for heating a portion of said dielectric liquid until a vaporous material rises therefrom and substantially fills said gap; a closure means extending above said rotor and said gap and retaining therebeneath the vaporous material given off by said dielectric liquid; and cooling means for cooling the vaporous material after it is discharged from said gap to return said vaporous material to said dielectric liquid.

16. A combination as defined in claim 15 in which said cooling means is above said closure means, and in which said closure means bounds an opening conducting said vaporous material to said cooling means.

17. In combination in a dynamo-electric machine: a rotor and a stator defining a vertically extending gap therebetween; a dielectric liquid communicating with the lower end of said gap; means for heating said dielectric liquid sufficiently to drive off a vaporous material which rises in said gap to substantially fill said gap; and cooling means communicating with the upper end of said gap and receiving the vaporous material discharged therefrom to cool this vaporous material until it re-unites with said dielectric liquid.

18. A combination as defined in claim 17 including a throttle means communicating between the upper end of said gap and said cooling means and through which said vaporous material passes to reach said cooling means.

19. In combination in a dynamo-electric machine: a rotor and a stator defining a gap therebetween; means for supplying a vaporous material to said gap; and throttle means at one end of said gap and providing a passage of smaller cross-sectional area than the cross-sectional area of said gap for throttling the flow of said vaporous material.

20. A combination as defined in claim 19 in which said rotor comprises a rotating element and in which said stator comprises a stationary element and in which said throttle means includes a bead structure at the end of one of said elements and extending toward the other of said elements to define a passage the distance across which is less than the distance across said gap.

21. In combination in a dynamo-electric machine: a stator; a rotatable element; a rotor operatively connected to said rotatable element and positioned adjacent said stator, said rotor and said stator cooperating in defining a gap therebetween; means for substantially filling said gap with a vaporous material, said means including a dielectric liquid capable when heated of giving off said vaporous material, and including a heating means for heating said dielectric liquid; and a wall extending from adjacent one end of said stator along said rotatable member but spaced therefrom to define an annular space therearound communicating with said gap to contain a portion of said vaporous material.

22. A combination as defined in claim 21 in which a portion of said wall extends inward into close proximity with said rotatable member to form one end of said annular space.

23. In combination in a submersible electric motor structure: a shell submerged in an external liquid and containing a dielectric liquid capable when heated of giving off a vaporous material; a stator in said shell; a rotor adjacent said stator and cooperating therewith in providing a gap; means for rotatably supporting said rotor; a heating means adapted to locally heat said dielectric liquid to expel some of said vaporous material at a position communicating with said gap whereby the dielectric liquid is displaced from said gap; and walls defining a storage chamber in open communication with said dielectric liquid and into which may flow said dielectric liquid displaced by said vaporous material.

24. In combination in a dynamo-electric machine: a stator; a rotor cooperating with said stator in defining a gap; a dielectric liquid in communication with said gap and capable of expelling a vaporous material when subjected to the temperature existing in said gap; and a cooling means spaced from said gap for maintaining a portion of said dielectric liquid at a temperature below that existing in said gap.

25. In combination in a dynamo-electric machine: a stator including a magnetic body and a rotor opening therein; a winding on said stator; a ring at one end of said magnetic body and fixed with respect thereto; and a rotor in said rotor opening of said stator and cooperating with said stator in defining a gap substantially filled with a vaporous material, said rotor also extending inside said ring and cooperating therewith in defining an annular throttle space communicating with said gap, the cross-sectional area of said throttle space being smaller than the cross-sectional area of said gap.

26. A combination as defined in claim 25 in which said rotor includes a winding which includes an end ring, and in which said end ring provides a projection positioned opposite said ring of said stator to define said annular throttle space.

27. A combination as defined in claim 12 in which said rotor includes a passage therein communicating with said dielectric liquid in said shell.

28. A combination as defined in claim 13 in which said heating means includes a winding on said stator, and including an auxiliary heating means communicating with said gap for heating said dielectric liquid.

29. A combination as defined in claim 19 including another throttle means at the other end of said gap and providing a passage of smaller cross-sectional area than said cross-sectional area of said gap.

30. In combination in a dynamo-electric machine: a stator comprising one element; a rotor comprising another element, said rotor and said stator defining a gap therebetween; a dielectric liquid capable when sufficiently heated of expelling a vaporous material; and heating means for heating said dielectric liquid and including a heater spaced from said gap and a winding on one of said elements, said heating means developing sufficient heat to expel said vaporous material whereby said gap contains said vaporous material.

CLARENCE J. COBERLY.